United States Patent

Sieczka et al.

Patent Number: 5,815,936
Date of Patent: Oct. 6, 1998

[54] DETACHABLE HOLOGRAM ASSEMBLY AND WINDAGE/ELEVATION ADJUSTER FOR A COMPACT HOLOGRAPHIC SIGHT

[75] Inventors: Eric James Sieczka, Ann Arbor; Anthony Mong-On Tai, Northville; Allen Corlies Ward, Ann Arbor, all of Mich.

[73] Assignee: Environmental Research Institute of Michigan, Ann Arbor, Mich.

[21] Appl. No.: 837,200

[22] Filed: Apr. 14, 1997

Related U.S. Application Data

[63] Continuation of Ser. No. 556,457, Nov. 15, 1995, abandoned, which is a continuation-in-part of Ser. No. 245,220, May 17, 1994, Pat. No. 5,483,362.

[51] Int. Cl.⁶ .................................. F41G 1/00; F41G 1/30
[52] U.S. Cl. ................................. 33/241; 33/233; 33/252; 359/1; 359/13; 42/103
[58] Field of Search ................................ 33/241, 233, 252, 33/254, 257, 258, 259, 265; 359/1, 13, 14, 15, 16, 19, 27; 42/103, 100

[56] References Cited

U.S. PATENT DOCUMENTS

| | | | |
|---|---|---|---|
| 2,148,272 | 2/1939 | Kyle | 33/258 |
| 2,633,051 | 3/1953 | Davis | 33/233 |
| 4,012,150 | 3/1977 | Upatnieks . | |
| 4,223,975 | 9/1980 | Upatnieks . | |
| 4,643,515 | 2/1987 | Upatnieks . | |
| 4,784,447 | 11/1988 | Latta et al. . | |
| 4,981,332 | 1/1991 | Smith . | |
| 5,148,314 | 9/1992 | Chen . | |
| 5,151,800 | 9/1992 | Upatnieks | 359/14 |
| 5,237,451 | 8/1993 | Saxe . | |
| 5,363,226 | 11/1994 | Strasser et al. . | |
| 5,369,888 | 12/1994 | Kay et al. | 33/241 |
| 5,373,644 | 12/1994 | DePaoli | 33/241 |
| 5,383,278 | 1/1995 | Kay | 33/241 |
| 5,483,362 | 1/1996 | Tai et al. | 359/1 |

FOREIGN PATENT DOCUMENTS

| | | |
|---|---|---|
| 0086764 | 8/1983 | European Pat. Off. . |
| 1190361 | 4/1965 | Germany . |
| 2919889 | 10/1980 | Germany . |

*Primary Examiner*—Christopher W. Fulton
*Attorney, Agent, or Firm*—Brooks & Kushman P.C.

[57] ABSTRACT

Detachable hologram assembly for a compact holographic sight includes a hologram of a reticle image or other desired alignment indicia mounted within a resilient, detachable frame. The frame includes a pair of generally planar, non-parallel registration surfaces and an aperture extending through the frame at the junction of the registration surfaces. A hologram mount, also including a pair of registration surfaces which are complimentary to those of the frame is affixed to, or integral with, the sight. A fastener secures the hologram assembly to the mount with a force sufficient to maintain the registration surfaces of the frame in frictional fit, respectively, with the corresponding registration surfaces of the mount. The angle of one registration surface relative to the other registration surface of the hologram frame is preferably slightly less than the angle between the registration surfaces of the hologram mount, so that as the frame is secured by the fastener to the mount, the ends of the registration surfaces of the frame are deflected, urging the registration surfaces into secure, registered contact with the respective registration surfaces of the mount. An elevation and windage adjustment mechanism may also be included in the hologram mount.

16 Claims, 5 Drawing Sheets

DETACHABLE HOLOGRAM ASSEMBLY AND WINDAGE/ELEVATION ADJUSTER FOR A COMPACT HOLOGRAPHIC SIGHT

This is a continuation of application Ser. No. 08/556,457 filed on Nov. 15, 1996, now abandoned which is a continuation-in-part of application, Ser. No. 08/245,220, filed on May 17, 1994 now U.S. Pat. No. 5,483,362.

TECHNICAL FIELD

This invention relates to a detachable hologram assembly and a windage and elevation adjustment mechanism which may be utilized on compact holographic sights.

BACKGROUND ART

There are several types of sights utilized with small arms, such as rifles, shotguns, hand guns, bows, and other similar, hand-held weapons.

Perhaps the simplest type is the iron sight consisting of a small notch on the near end of the weapon and a bar on the far end of the weapon. When aiming, the notch, the bar, and the target must all be aligned. There are several drawbacks to this simple sight. The shooter must shift his/her focus between the sight and the target, which is difficult, particularly when the shooter or the target is moving. The notch and bar also partially block the targets seen. And, under low ambient light conditions, these sights are difficult to use due to the reduced depth of focus of the eye.

Another common sight is the telescopic sight. With this sight, the image is magnified and a reticle pattern is superimposed on the image scene at an intermediate image plane. Primarily used for aiming at distant stationary targets, telescopic sights are not suitable for use with moving targets or when the shooter is moving, because of the small field of view and exit aperture of the sight.

Another commonly used sight is the reflex type. This sight utilizes an illuminated reticle and a lens that collimates every point of the reticle to project the reticle pattern to the target plane. A partially reflecting mirror or beam combiner is located downstream of the collimating lens to superimpose the reticle pattern over the real world scene. The exit aperture is the same size as the collimating lens, but is recessed further from the viewer. The eye position from which the reticle can be seen is thus restricted by the lens diameter and the recessed exit aperture. Also, these sights are bulky and heavy unless they utilize smaller, simpler collimating lens, in which case the eye position from which the reticle can be seen without parallax is further restricted. The simple lens designs also tend to produce poor off-axis performance, which limits the size of the reticle that can be used.

A second type of reflex sight utilizes a tilted, off-axis spherical or parabolic reflector to collimate a point source from a light-emitting diode (LED). The reflector is spectrally coated to reflect only the red light of the LED and transmit the other wavelengths. This type of sight, commonly referred to as a "red dot sight", can only project a single dot due to the off-axis aberration of spherical or parabolic reflectors.

Laser designator sights are also utilized with small arms. A laser beam, usually from a laser diode, illuminates the target scene. The user positions the laser beam on the target to aim the weapon. This sight is undesirable in many applications since the laser emission could act as a targeting beacon for an adversary. The laser designator sight is also ineffective under many conditions. While laser radiation can maintain a small spot size over a long propagation distance, the brightness of the image of the spot scattered by the target surface reduces with range by a factor of $1/R^2$, where R is the target range. Thus, the laser light spot can be difficult to find under strong ambient light or at longer ranges. Also, the laser designator sight is ineffective in an application having a background, such as the sky, where there is no surface from which the laser beam would be scattered. Moreover, if there is more than one shooter using a laser designator sight, the multiple dots at the target plane can be confusing. Finally, laser designator sights are illegal for hunting in many states because they illuminate the target.

Holographic line sights for large weapons have also been developed. Once such sight is disclosed in U.S. Pat. No. 4,012,150, issued to Upatnieks. This holographic sight, however, is bulky, particularly since it requires a relatively large, stable wavelength laser.

A number of compact hologram displays have been developed, including the edge illuminated holograms disclosed in U.S. Pat. Nos. 4,643,515 and 5,151,800, both also issued to Upatnieks. These hologram displays have a compact monolithic structure They also utilize a diffraction or reflection grating to minimize the effects of the wavelength drift of the laser diode light beam. These edge illuminated, monolithic holographic displays are, however, relatively expensive, and until now have not been incorporated into sights.

It is, therefore, desirable to provide a compact, inexpensive holographic gun sight which may be effectively used with small arms.

In particular, it is desirable to provide such a sight with a detachable hologram, so that the reticle image or other alignment indicia may be quickly and easily changed. In addition, the hologram must be accurately registered on the sight to maintain the proper orientation of the hologram relative to the illuminating beam. Finally, the hologram must remain installed securely in position despite the recoil forces encountered as a result of repeated firing of the weapon.

It is also desirable to provide a compact, precise, and stable adjustment mechanism for easy adjustment of the elevation and windage of the reticle image of the hologram during use.

DISCLOSURE OF THE INVENTION

It is therefore an object of the present invention to provide a detachable hologram assembly for a holographic gun sight which is quickly and easily installed.

It is another object of the present invention to provide a detachable hologram assembly which is quickly and accurately registered to the illuminating beam of the sight.

It is yet another object of the present invention to provide a detachable hologram assembly which, once installed, remains stable and intact over many rounds of fire.

It is yet another object of the present invention to provide a hologram mount including a precise and easy-to-operate adjustment mechanism for adjusting the windage and elevation of the hologram.

It is yet another object of the present invention to provide a hologram mount for a holographic gun sight including windage and elevation adjustment mechanisms which, once adjusted, remain stable despite repeated firing of the weapon.

In carrying out the above and other objectives, the detachable hologram assembly of the present invention includes a hologram of a reticle image or other desired alignment indicia mounted within a resilient, detachable frame. The frame includes a pair of generally planar, non-parallel registration surfaces and an aperture extending through the frame at the junction of the registration surfaces. A hologram mount, also including a pair of registration surfaces which are complimentary to those of the frame to accommodate the detachable hologram assembly is affixed to, or integral with, the sight. A fastener secures the hologram assembly to the mount with a force sufficient to maintain the registration surfaces of the frame in frictional fit, respectively, with the corresponding registration surfaces of the mount. The angle of one registration surface relative to the other registration surface of the hologram frame is slightly less than the angle between the registration surfaces of the hologram mount, thereby ensuring that when the fastener is tightened to supply sufficient force to deflect the registration surfaces of the frame into engagement with the registration surfaces of the mount, there is a spring force at the deflected ends of the registration surfaces of the frame, urging the surfaces into secure, registered contact with the respective registration surfaces of the hologram mount.

In the preferred embodiment the frame is generally L-shaped in cross section, and the registration surfaces for the frame include a generally vertical registration surface and a generally horizontal registration surface. In this embodiment the hologram mount also includes a generally vertical registration surface and a generally horizontal registration surface to accommodate the registration surfaces of the frame. A screw secures the frame to the mount through a threaded aperture located at the junction of the generally vertical and generally horizontal registration surfaces. The screw is preferably oriented at about a 45° angle, thereby bisecting the angle between the registration surfaces and exerting approximately equal retaining forces on each of the vertical and horizontal registration surfaces.

The hologram mount may also include an adjustment mechanism comprising a base portion, an adjuster arm having one end pivotally mounted on one end of the base portion and the other end adjustably mounted to the other end base portion, and a spring or other biasing mechanism mounted between the ends of the adjuster arm to provide sufficient spring force between the adjuster arm and the base portion to ensure stability, once adjusted, despite repeated firing of the weapon.

An adjuster shaft is slidably mounted on the base portion to extend into engagement with a threaded aperture in the adjuster arm. In one embodiment, a worm gear is mounted within the adjuster arm and includes the threaded aperture for receiving the threaded portion of the adjuster shaft. A control knob is mounted on one end of an adjuster screw, which includes a worm thread on the other end which is mounted orthogonally for engagement with the worm gear, such that a relatively large rotation of the adjustment knob effects a very small rotation of the worm gear and, concomitantly, a very fine adjustment in the position of the adjuster arm relative to the base portion of the mount. The adjuster shaft preferably includes a generally spherical or cylindrical bearing surface at the end of the shaft which engages the base portion of the mount, and the base portion of the mount likewise preferably includes a generally spherical or cylindrical mating surface for engaging the bearing surface of the shaft, so that as the shaft is threadably positioned on the worm gear, changing the angle of the shaft relative to the base portion, an even distribution of the spring and/or recoil forces over the mating bearing surfaces of the shaft and the base portion is maintained.

The above objects and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
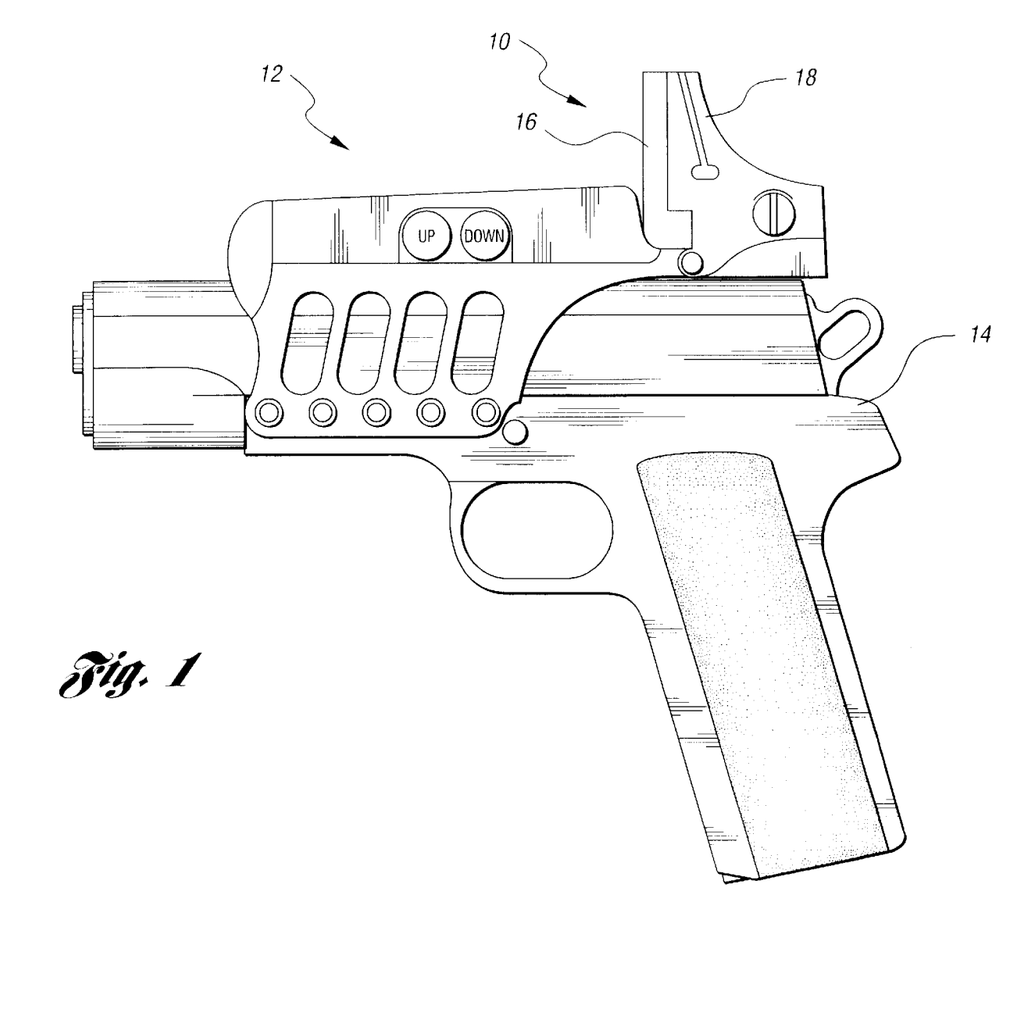
FIG. 1 is a plan perspective view of a holographic sight including the detachable hologram assembly and windage/elevation adjuster of the present invention.
Figure 2:
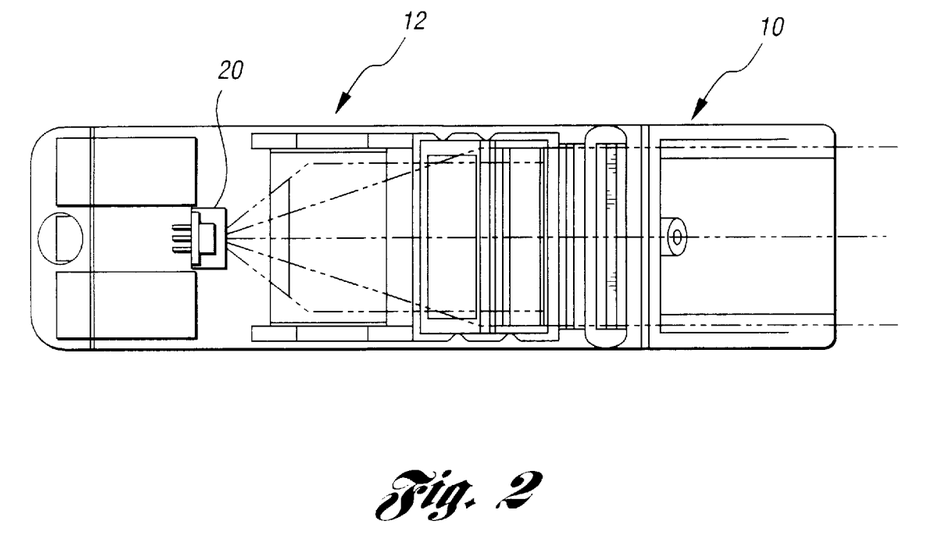
FIG. 2 is a top cross-sectional view of the sight of FIG. 1.
Figure 3:
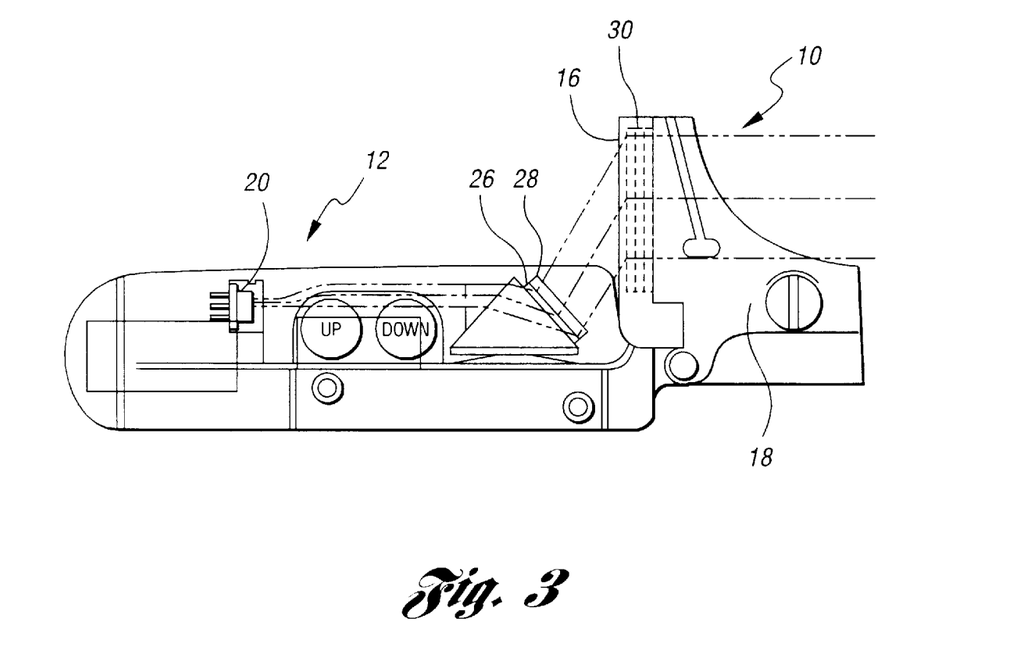
FIG. 3 is a side cross-sectional view of the sight of FIG. 1.

Referring to FIGS. 1–3 of the drawings, the detachable hologram assembly constructed in accordance with the present invention is generally indicated by 10. The present invention may be utilized with any compact holographic sight 12, which may be mounted upon any hand held arm such as a pistol 14. The detachable hologram assembly 10 includes a resilient frame 16 in which a hologram of a reticle image or other desired alignment indicia is securely mounted. The frame 16 is releasably mounted on a hologram mount 18 which includes complimentary registration surfaces which provide frictional contact with the frame 16 to provide quick accurate registration of the frame on the mount 18.

As previously indicated, the present invention 10 may be used with a compact holographic gun sight of the type shown schematically in FIGS. 2 and 3. This holographic sight includes a laser diode 20 which provides an illuminating beam, a prism assembly 22 including a prism 24, a diffraction grating with integral off-axis hologram 26 and a glass cover plate 28 to collimate and circularize the laser beam, for proper illumination of a hologram 30. Additional details of the design of the gun sight are disclosed in U.S. patent application Ser. No. 08/245,220, which is commonly assigned to the assignee of this patent application, and which is incorporated by reference herein. It will be appreciated that the detachable hologram assembly of the present invention may be utilized with holographic gun sights incorporating other optical arrangements, including alternate embodiments disclosed in the above-described application Ser. No. 08/245,220, or as otherwise might be available to those skilled in the art of such designs, without departing from the spirit of the present invention.

Figure 4:
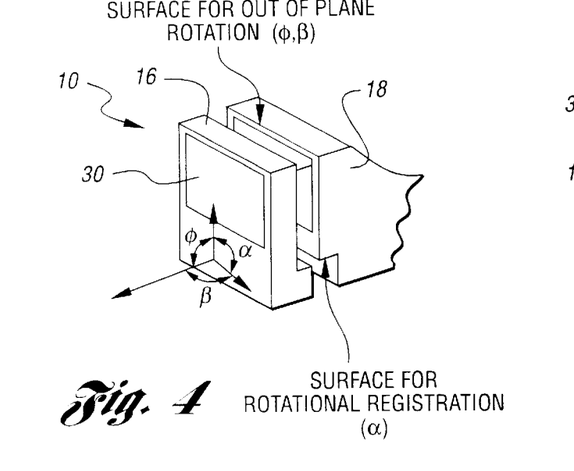
FIG. 4 is a plan perspective schematic view of the detachable hologram assembly of the present invention.
Figure 5:
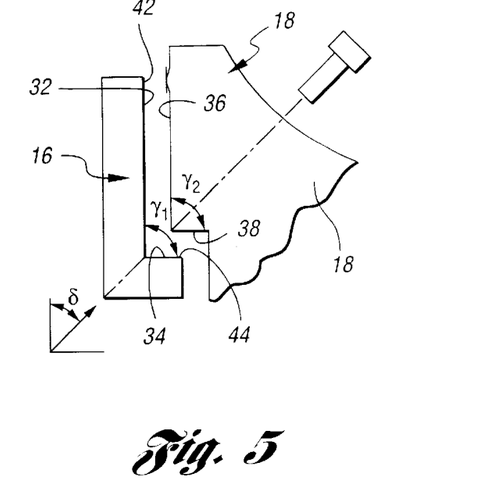
FIG. 5 is a side schematic view of the frame, mount and fastener of the detachable hologram assembly.
Figure 6:
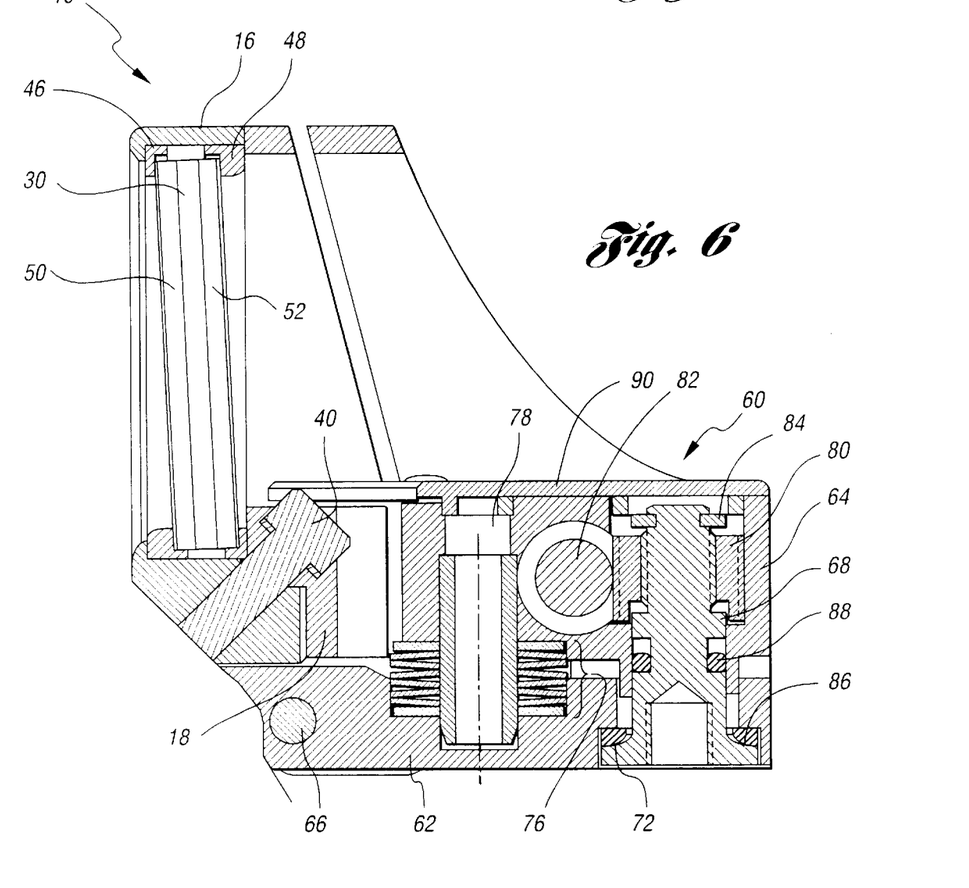
FIG. 6 is a side cross-sectional view of one embodiment of the detachable hologram assembly of the present invention.

FIGS. 4 and 5 schematically illustrate the detachable hologram assembly 10 of the present invention. The hologram frame 16 is preferably constructed of a resilient material, such as aluminum, although other resilient materials such as plastic, may be employed for this purpose. The hologram 30 of a reticle image or other alignment indicia is fixedly mounted in the frame 16. In this embodiment, the frame includes a generally vertical registration surface 32 and a generally horizontal registration surface 34. The mount 18 is secured to, or integral with, the remaining portion of the holographic gun sight 12. The mount 18 includes a generally vertical registration surface 36 and a generally horizontal registration surface 38 which contact the corresponding registration surfaces 32 and 34, respectively, of the frame 16 when the frame is secured to the mount with a screw 40 or other fastener which can be quickly released and re-secured to another frame having a hologram with an alternate reticle pattern. It will be appreciated that, since a hologram is insensitive to translational variations (i.e., only rotational registration is required), any orientation of the registration surfaces which establishes the correct angular orientation of the hologram (i.e., which establishes the appropriate $\alpha$, $\beta$, and $\phi$, as shown in FIG. 4) may be employed. Thus, although the embodiments of FIGS. 4–6 depict a pair of generally orthogonal registration surfaces defining an L-shape, any pair of registration surfaces which define non-parallel planes may be utilized to effect the desired registration.

The angle, $\gamma_1$, of the generally vertical registration surface 32 relative to the generally horizontal registration surface 34, is preferably slightly less than the angle, $\gamma_2$, of the generally vertical registration surface 36 relative to the generally horizontal registration surface 38 of the mount 18. When the frame 16 is secured on the mount 18, the registration surfaces 32 and 34 are urged by the retaining force of the screw into complete contact with the registration surfaces 36 and 38 on the mount, with the slight deflection caused by the difference in $\gamma_1$ and $\gamma_2$ creating a spring force which urges the ends of the frame 42 and 44 into contact with the mount 18 with a greater force. In the embodiment of FIG. 6, $\gamma_1$ is preferably about 90°, and $\gamma_2$ is about 90.25°. It will be appreciated, however, that the difference between $\gamma_1$ and $\gamma_2$ may be varied, depending upon the material utilized for the frame, as well as the angular orientation of the registration surfaces and the desired deflection. Likewise, while the registration surfaces of the frame shown in FIG. 6 define an angle of less than 180°, and the complimentary registration surfaces of the mount define an angle greater than 180°, alternative designs may be employed in which the registration surfaces on the frame define an angle of greater than 180° and the complimentary registration surfaces on the mount define an angle of less than 180°. In these alternative designs, the angle, $\gamma_1$, of the registration surfaces on the frame would preferably be slightly greater than the angle, $\gamma_2$, of the registration surfaces on the mount, to achieve the desired deflection of the frame upon attachment.

Thus, frame 16 may be quickly removed from the mount 18 by releasing a single screw 40 and another hologram may be quickly installed with accurate reregistration. As will be appreciated by those skilled in the art, these simple, generally orthogonal registration surfaces ensure the proper planar orientation (angle $\phi$) in the viewing axis, as well as the angles ($\alpha$, $\beta$) orthogonal to the viewing axis.

The screw 40 is positioned to engage the frame 16 in a threaded aperture which extends through the intersection of the registration surfaces 32, 34, 36, 38 on the frame 16 and mount 18. The screw 40 is mounted at an angle $\delta$ from horizontal that provides the appropriately desired components of the retaining force on each of the registration surfaces of the frame 16. In the illustrated embodiment, $\delta$ is about 45°, which roughly equally distributes the retaining force of the screw to each of the orthogonal registration surfaces 32, 34.

Figures 8, 9:
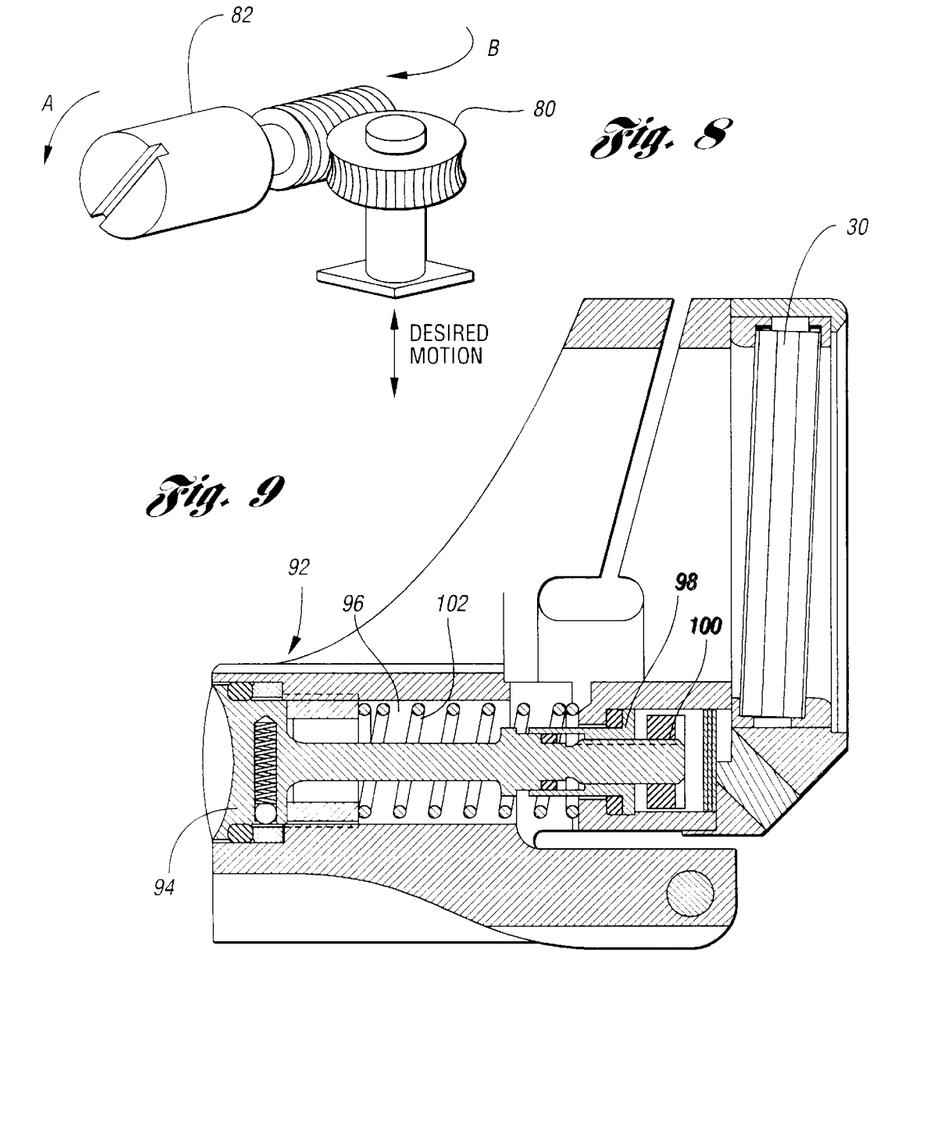
FIG. 8 is a schematic of the worm gear adjuster employed in the embodiment of FIG. 6.
FIG. 9 is a partial side cross-sectional view of the embodiment of the elevation adjustment mechanism of FIG. 6.
Figure 10:
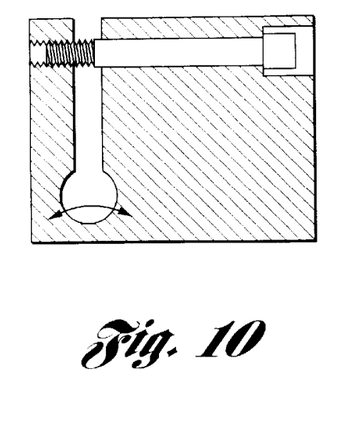
FIG. 10 is a schematic view of the windage adjustment mechanism employed in the embodiment of FIG. 9.
Figure 11:
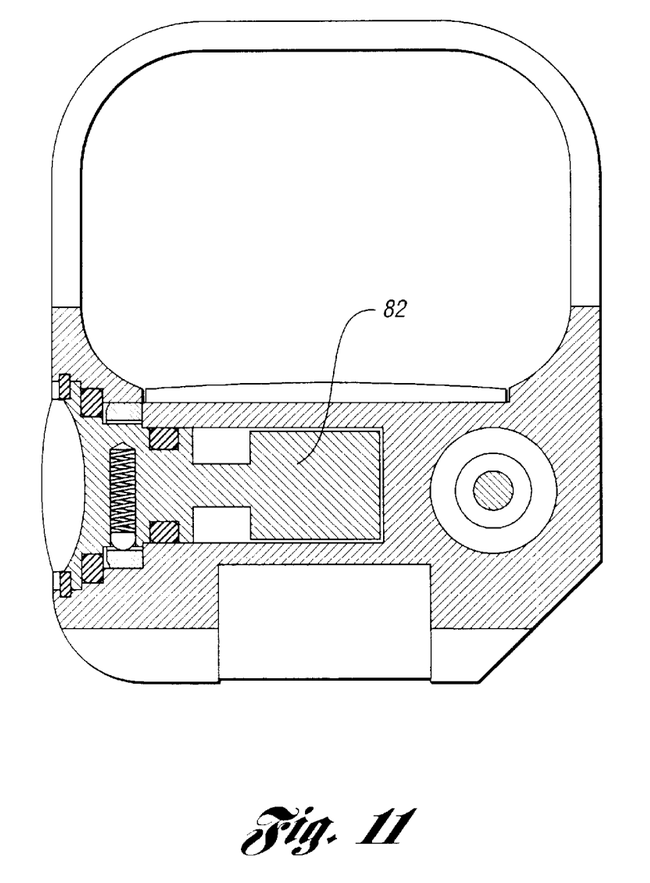
FIG. 11 is a partial rear cross-sectional view of the embodiment of FIG. 6.

One embodiment of the detachable hologram assembly 10 is shown in FIGS. 6, 9 and 11. In this embodiment, the frame 16 is aluminum. A hologram tray 46, preferably fabricated of molded plastic, is cemented into place within the frame 16 to provide a secure receptacle for the hologram 30. The hologram 30 is preferably mounted between two glass cover plates 50, 52 (each of which are preferably provided with an anti-reflection coating). The hologram 30 and cover plates 50 and 52 are positioned in tray 46, secured with a suitable adhesive, such as an epoxy cement, and clamped into position with a second molded plastic tray 48 which, in turn, is also cemented into position inside the frame 16. As shown, the trays 46, 48 are preferably designed with mounting surfaces which tilt the hologram 30 at the appropriate angle to maximize wavelength compensation as required by the optics and geometry of the particular gun sight in which the hologram assembly 10 is employed.

Figure 7:
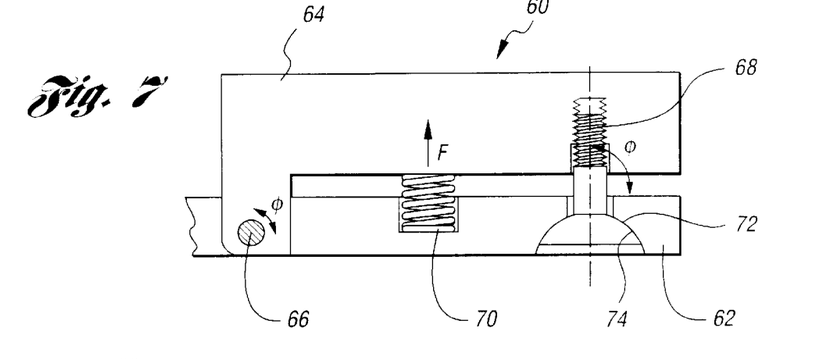
FIG. 7 is a schematic view of one embodiment of the adjustment mechanism.

Referring now to FIGS. 7 and 8, the present invention may also include one or more adjusters in the mount 18 for quickly and precisely varying the windage and elevation of the hologram. One adjuster 60, shown schematically in FIG. 7, includes a base 62 which is secured to or integral with the gun sight, an adjuster arm 64 which is pivotally mounted at one end to the base 62 by virtue of a pivot pin 66 or other known method of pivotally securing one member to another. The adjuster arm 64 is positionably mounted, via adjuster shaft 68, which in turn is retained in place in the base 62.

A spring 70 or other biasing mechanism is mounted between the adjuster arm 64 and the base 62 to maintain a constant spring force which stabilizes the adjuster arm 64 in a selected position relative to the base 62 In the embodiment shown in FIG. 6, the biasing mechanism comprises a plurality of Belleville washers which are mounted on a positioning shaft 78 within suitably shaped recesses in the adjustment arm 64 and the base 62.

The adjuster shaft 68 preferably includes a bearing surface 72 that is shaped as a portion of a sphere. The base 62 also preferably includes a bearing surface 74 which is shaped as a mating spherical surface 74. It will be appreciated that the bearing surfaces of the adjuster shaft 68 and the base 62 may be shaped as a portion of a cylinder which similarly allows for uniform distribution of forces exerted between the adjuster shaft 68 and the base 62 as the adjustment angle, $\phi$, is changed. The mated, partially spherical or cylindrical bearing surfaces on the adjuster shaft 68 and the base 62 of the mount 18 equally distribute the spring force, as well as any recoil forces, over a constant area regardless of the adjustment angle, $\phi$, of the adjuster arm 64 and the adjustment shaft 68. In its simplest form, the adjuster shaft is threaded, and threadably engages a mating receptacle in the adjustment arm 64 to allow for adjustment of the elevation of the hologram by rotation of the adjusting shaft 68.

It is typically desirable to achieve a very fine rotation in the angle of elevation (e.g., less than 0.5 minutes of angle) as the result of a relatively coarser rotation of a hand-operated adjustment screw. The adjustment mechanism of this embodiment, therefore, provides for very precise elevational positioning of the hologram by virtue of the reduction ratio provided by a worm gear 80 which is mounted within a suitable receptacle in the adjuster arm 64. An adjuster screw 82 is mounted in a generally orthogonal relationship to the worm gear 80. The adjuster screw 82 includes a mating worm thread which is positioned within the adjuster arm 62 for engagement with the worm gear 80 such that rotation of the adjusting screw 82 provides a fraction (preferably about 10 to 1) of the angular rotation of the worm gear 80. The adjuster shaft is threadably mounted in a threaded aperture in the worm gear 80, so that the rotation of the worm gear 80 causes a change in the vertical position of the adjuster shaft 68 relative to the worm gear 80 and, therefore, adjustment in the vertical position of the adjuster arm 64 relative to the base 62. The outward travel of adjuster shaft 68 relative to the worm gear 80 is limited by a spring clip 84. The partially spherical bearing surface 72 of the adjuster shaft 64 bears upon a spherical washer 86 which is positioned within a suitably sized receptacle in the base 62. An O-ring 88 may be provided in a suitably positioned receptacle to seal the worm gears 80, 82 from the environment.

The embodiment shown in FIG. 6 also utilizes a cap 90 which is secured in position atop the adjuster arm 64 to likewise seal the adjustment mechanism contained therein from the outside environment. This cap 90 is preferably fabricated from a resilient plastic and provided with a dull matte surface finish to reduce glare. It will be appreciated that, while the adjuster mechanism 60 shown in FIG. 6 facilitates elevation adjustment of the hologram, a similar mechanism may be employed, appropriately reoriented, to facilitate a windage adjustment of the hologram.

In the alternative, as shown in FIG. 9, a more compact windage adjuster 92 is employed on the embodiment of FIGS. 6 and 9. In this windage adjustment mechanism 92, a flexure hinge is machined in the aluminum base of the adjuster arm 64 to provide for a flex about a generally vertical axis, thereby accommodating for a windage adjustment. An adjustment screw 94 is mounted for rotation within a receptacle 96 in the adjustment arm 64 so that one end is threadably secured, via a retaining nut 98. The retaining nut 98, and therefore the portion of the mount including the hologram 30, travels on the threads of the screw 94, thereby changing the windage angle, $\beta$, of the hologram 30. Again, the adjustment mechanism preferably includes a spring 102 or other suitable equivalent to provide a biasing force to stabilize the adjustment mechanism.

While the best mode for carrying out the invention has been described in detail, those familiar with the art to which the invention relates will recognize various alternative designs and embodiments for practicing the invention as disclosed by the following claims.

What is claimed is:

1. In a compact holographic gun sight, a detachable hologram assembly comprising:
   a hologram of a desired alignment indicia;
   a resilient frame including an aperture for fixedly mounting the hologram therein, the frame including a pair of generally planar, non-parallel registration surfaces;
   a hologram mount including a pair of generally planar, non-parallel registration surfaces which accommodate the registration surfaces of the frame; and
   a fastener for securing the frame including the hologram to the hologram mount with the registration surfaces of the frame in registering contact with the registration surfaces of the mount.

2. The detachable hologram assembly of claim 1 wherein the angle between the registration surfaces of the frame varies from the angle between the registration surfaces of the hologram mount, by an amount sufficient to ensure that, when the frame is secured to the hologram mount the registration surfaces of the frame are deflected into a secure fit with the registration surfaces of the hologram mount.

3. The detachable hologram assembly of claim 1 wherein the hologram mount further includes:
   a base portion;
   an elevation adjuster arm including one end pivotally mounted to the base portion and the other end adjustably mounted to the base portion with a spring bias mounted between the ends of the adjuster arm, thereby providing a stabilizing spring force between the adjuster arm and the base portion, and wherein the other end is adjustably mounted to the base portion by an adjuster shaft which is pivotally connected to the base portion, extends into the adjuster arm and is threadably engaged with a threaded aperture in the adjuster arm.

4. The assembly of claim 3 wherein the adjuster arm includes a worm gear having a threaded aperture which threadably engages the adjuster shaft, and an adjuster screw having an adjuster knob at one end and a worm at the other end, the adjuster screw being mounted generally orthogonally to the adjuster shaft for rotation within the adjuster arm so that the worm engages the worm gear to provide sensitive adjustment of the angle of the adjuster arm relative to the base portion of the mount.

5. The adjustable mount of claim 3 wherein the adjuster shaft includes a generally spherical bearing surface at the end of the shaft mounted within the base portion of the mount, and the mount includes a complimentary, generally spherical bearing surface which engages the generally spherical bearing surface of the adjuster shaft to provide even distribution of the spring force exerted on the adjuster shaft.

6. The adjustable mount of claim 3 wherein the adjuster shaft includes a bearing surface having a generally cylindrical portion at the end of the shaft mounted within the base portion of the mount, and the mount includes a complimentary bearing surface having generally cylindrical portion which engages the bearing surface of the adjuster shaft to provide even distribution of the forces exerted on the adjuster shaft.

7. In a compact holographic gun sight, an adjustable mount for a hologram, the adjustable mount comprising:
   a base portion; and
   an elevation adjuster arm including one end pivotally mounted to the base portion and the other end adjustably mounted to the base portion with a spring bias mounted between the ends of the adjuster arm, thereby providing a stabilizing spring force between the adjuster arm and the base portion, and wherein the other end is adjustably mounted to the base portion by an adjuster shaft which is pivotally connected to the base portion, extends into the adjuster arm and is threadably engaged with a threaded aperture in the adjuster arm, wherein the adjuster arm includes a worm gear having a threaded aperture which threadably engages the adjuster shaft, and an adjuster screw having an adjuster knob at one end and a worm at the other end, the adjuster screw being mounted generally orthogonally to the adjuster shaft for rotation within the adjuster arm so that the worm engages the worm gear to provide sensitive adjustment of the angle of the adjuster arm relative to the base portion of the mount.

8. The adjustable mount of claim 7 wherein the adjuster shaft includes a bearing surface having a generally spherical portion at the end of the shaft mounted within the base portion of the mount, and the mount includes a complimentary bearing surface having generally spherical portion which engages the bearing surface of the adjuster shaft to provide even distribution of the forces exerted on the adjuster shaft.

9. The adjustable mount of claim 7 wherein the adjuster shaft includes a bearing surface having a generally cylindrical portion at the end of the shaft mounted within the base portion of the mount, and the mount includes a complimentary bearing surface having generally cylindrical portion which engages the bearing surface of the adjuster shaft to provide even distribution of the forces exerted on the adjuster shaft.

10. In a compact holographic gun sight, a detachable hologram assembly comprising:

a hologram of a desired alignment indicia;

a resilient frame including an aperture for fixedly mounting the hologram therein, the frame having a generally L-shaped cross section including a generally vertical registration surface and a generally horizontal registration surface;

a hologram mount affixed to the sight, the mount including a generally vertical registration surface and a generally horizontal registration surface, and wherein the angle between the generally vertical registration surface and generally horizontal registration surface of the frame is slightly smaller than the angle between the generally vertical registration surface and generally horizontal registration surface of the hologram mount; and a fastener for securing the frame including the hologram to the hologram mount at the intersection of the registration surfaces with a force sufficient to deflect the generally vertical and generally horizontal registration surfaces of the frame into a secure fit with the generally vertical and generally horizontal registration surfaces of the hologram mount.

11. The assembly of claim 10 wherein the angle between the registration surfaces of the frame is about 0.25° less than the angle between the registration surfaces of the mount.

12. The assembly of claim 10 wherein the fastener is a screw and the frame includes a threaded aperture oriented at an angle of about 45° to receive the screw.

13. The assembly of claim 10 wherein the hologram mount further includes:

a base portion;

an elevation adjuster arm including one end pivotally mounted to the base portion and the other end adjustably mounted to the base portion with a spring bias mounted between the ends of the adjuster arm, thereby providing a stabilizing spring force between the adjuster arm and the base portion, and wherein the other end is adjustably mounted to the base portion by an adjuster shaft which extends into the adjuster arm and is threadably engaged with a threaded aperture in the adjuster arm, the adjuster shaft is pivotally connected to the base portion.

14. The assembly of claim 13 wherein the adjuster arm includes a worm gear having a threaded aperture which threadably engages the adjuster shaft, and an adjuster screw having an adjuster knob at one end and a worm at the other end, the adjuster screw being mounted generally orthogonally to the adjuster shaft for rotation within the adjuster arm so that the worm engages the worm gear to provide sensitive adjustment of the angle of the adjuster arm relative to the base portion of the mount.

15. The assembly of claim 13 wherein the adjuster arm includes a worm gear having a threaded aperture which threadably engages the adjuster shaft, and an adjuster screw having an adjuster knob at one end and a worm at the other end, the adjuster screw being mounted generally orthogonally to the adjuster shaft for rotation within the adjuster arm so that the worm engages the worm gear to provide sensitive adjustment of the angle of the adjuster arm relative to the base portion of the mount.

16. The adjustable mount of claim 13 wherein the adjuster shaft includes a generally spherical bearing surface at the end of the shaft mounted within the base portion of the mount, and the mount includes a complimentary, generally spherical bearing surface which engages the generally spherical bearing surface of the adjuster shaft to provide even distribution of the spring force exerted on the adjuster shaft.

* * * * *